W. R. MARSHALL.
SAFETY DEVICE FOR AEROPLANES.
APPLICATION FILED APR. 2, 1921.

1,433,395.

Patented Oct. 24, 1922.
2 SHEETS—SHEET 1.

Inventor
William R. Marshall,
By
Attorney

W. R. MARSHALL.
SAFETY DEVICE FOR AEROPLANES.
APPLICATION FILED APR. 2, 1921.

1,433,395.

Patented Oct. 24, 1922.
2 SHEETS—SHEET 2.

William R. Marshall, Inventor

Patented Oct. 24, 1922.

1,433,395

UNITED STATES PATENT OFFICE.

WILLIAM R. MARSHALL, OF CONGRESS JUNCTION, ARIZONA.

SAFETY DEVICE FOR AEROPLANES.

Application filed April 2, 1921. Serial No. 458,106.

*To all whom it may concern:*

Be it known that I, WILLIAM R. MARSHALL, a citizen of the United States of America, residing at Congress Junction, in the county of Yavapai and State of Arizona, have invented new and useful Improvements in Safety Devices for Aeroplanes, of which the following is a specification.

The object of the invention is to provide simple, relatively inexpensive and efficient means which normally may be housed in inconspicuous and unobstructive relation with the body portion or fuselage of an aeroplane, to serve in the event of accident to the craft, such as the stopping of the engine, and resulting in a nose spin or like dangerous position of the vehicle to check the movement thereof and restore the same to a normal or substantially normal position, to the end that a safe landing may be effected, and more particularly to provide a device for the purpose indicated whereby the craft under the control of the safety device will be held in a position insuring a gradual and controlled descent, as distinguished from those devices which are designed merely to restore the craft to an even keel; and with these objects in view the invention consists in a construction and combination of parts of which a preferred embodiment is shown in the accompanying drawing, wherein:—

Figure 1:
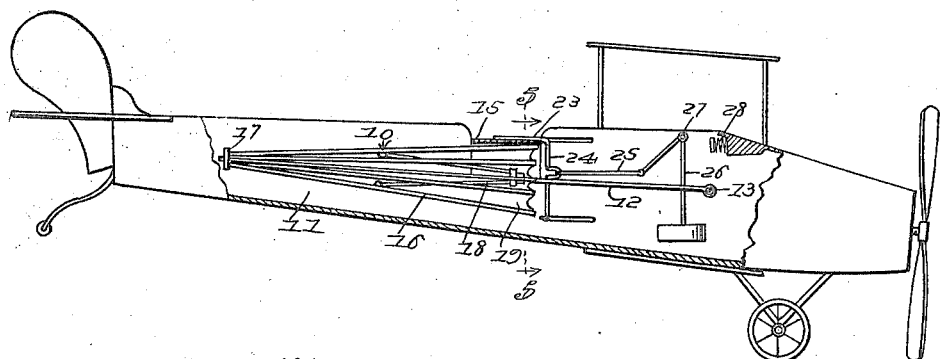
Figure 1 is a side view of an aeroplane equipped with an apparatus embodying the invention, the shell of the fuselage being partly broken away to show the parachute in its housed position.
Figure 2:
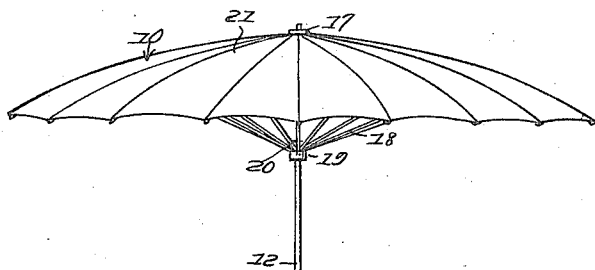
Figure 2 is a similar view showing the parachute extended and indicating the position of the body of the car when supported thereby.
Figure 2:
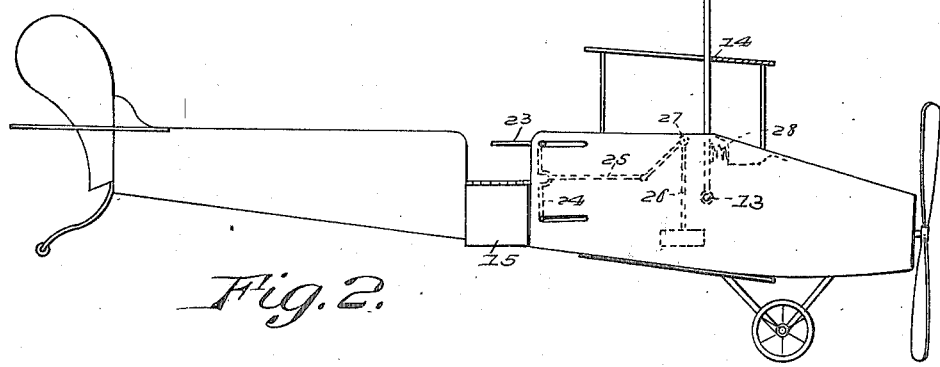
Figure 3:
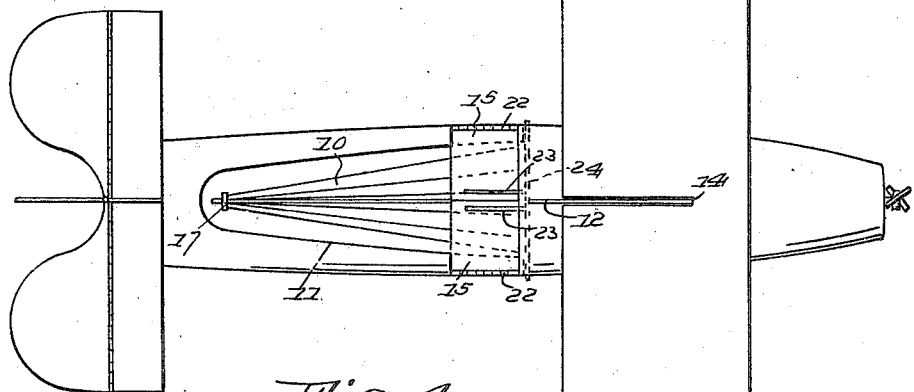
Figure 3 is a plan view.
Figure 4:
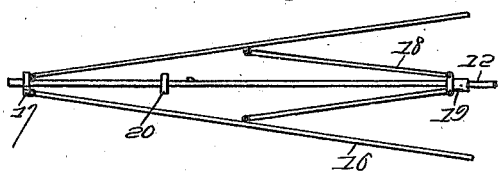
Figure 4 is a detail elevational view of the parachute frame.
Figure 5:
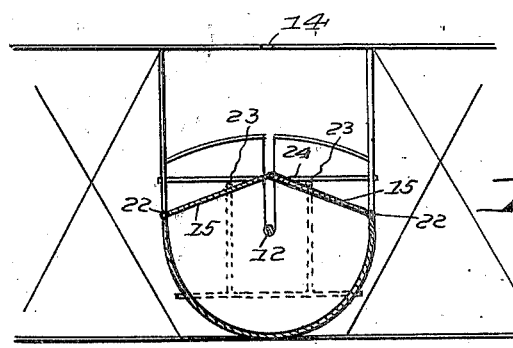
Figure 5 is a transverse section on the plane indicated by the line 5—5 of Figure 1.

The apparatus embodying the invention may be applied to an aeroplane of any of the well known or commercial types and is illustrated in the drawings in connection with a conventional form thereof without any attempt to show the details of construction or means of operating the same, and said apparatus consists essentially of a foldable or collapsible parachute 10, normally arranged in a housing or seat 11, formed longitudinally in the fuselage and embodying a stem or staff 12 which is pivotally mounted as at 13 and is adapted to assume a substantially upright position as indicated in Figure 2 limited in its movement relative to the body of the car by a stop 14, said parachute being normally held in its housed or folded position by retaining means such as hinged keeper members 15 uniting to span the seat 11 to hold the parachute in its folded position, and trip mechanism applied in like manner to both sides of the plane for releasing the retaining means when the car assumes a position indicating danger.

The parachute proper is constructed in general features to correspond with commercial forms of umbrellas, in that the radial ribs 16 thereof are hinged to a center plate 17 carried by the stem or staff 12, and are intermediately connected by braces 18 with a runner 19 slidingly mounted upon the stem and staff and limited in its upward movement by a stop 20, the cover 21 which obviously should be of canvas or other flexible but strong material capable of resisting the strains applied thereto, being arranged in contact with the inner surfaces of the ribs and being attached thereto in any suitable manner.

The retainer members 15 which together form an arch spanning the seat in which the parachute is normally housed are illustrated as being hinged at 22 to the frame or fuselage of the car for separation at their inner edges so as to open or fold laterally to instantly move out of the way of the parachute when released to afford no obstruction to the movement of the parachute toward its operative position, and said retainer members, as illustrated, are secured in their normal or retaining positions by a bolt 23 movable longitudinally of the car and carried for example by a cross head 24 connected by a link 25 with an oscillatory weighted operating lever 26 fulcrumed as at 27, the pendent or weighted arm of said lever being normally maintained in a vertical position and being variable in relation to the body of the car by gravity the same mechanism being applied to both sides of the plane, to the end that when the car is tilted forward to an extent which is regarded as representing the limit of safety, as for example 50° its position will be such as to withdraw the locking bolts from engagement with the retaining members and thereby release the parachute which due to the downward movement of the car, and the fact that the air in passing rearwardly over the surface of the fuselage will engage the folds of the parachute, will be extended and the stem or staff will be swung upon its pivot into a vertical position serving to check the downward movement of the car and support the same in position to make a gradual descent.

The forward movement of the stem or staff of the parachute with relation to the body of the car is preferably limited, however, by the stop 14 slightly short of a position perpendicular to the longitudinal axis of the car so that when the parts reach a condition of equilibrium wherein the car is supported by the parachute, the longitudinal axis of the car will be at a slight inclination downward toward its front end, and may not be brought to a horizontal position, so that while the car is thus substantially supported, its position is such as to insure descent under conditions which enable the operator to effect a landing at a selected point.

The fulcrum of the parachute, that is to say the point of connection of the lower end of the stem or staff, is preferably slightly forward of the center of gravity of the machine, and therefore, any tendency of the parachute to rise will serve to raise the nose of the plane, and in proportion to this elevation of the nose the wings of the plane will take up the pressure previously carried solely by the parachute and thus relieve the same, so that the pilot by proper manipulation of the various controls of his car and especially those of the wings, will be able to effectively guide the plane and control it to the best available landing. In the event, however, that the pilot is unable by reason of physical condition to manipulate the controls, the parachute will serve to bring the car to a landing with the minimum risk of damage either to the car or its occupants.

Preferably there is interposed between the runner and the stop which is carried by the stem or staff, and therefore in the path of the runner as the parachute opens, a cushion 28 consisting of a coiled spring or the equivalent thereof which serves to relieve the jar or jolt incident to the sudden opening of the parachute and the imposition of the weight of the car thereon.

Having described the invention what is claimed as new and useful is:—

A safety device for aeroplanes comprising the combination with a fuselage formed longitudinally with a housing, a foldable parachute having a staff pivotally mounted at its lower end in the forward end of the fuselage and adapted when folded to lie in said housing, keeper members hingedly attached to the fuselage on opposite sides of said housing and adapted to straddle the parachute to retain the latter in the housing, a bolt engaging said keeper members to retain them in locking position, a cross head operatively connected with the bolt, a weighted operating lever pivotally mounted in the fuselage, and a link connecting said lever with said cross head, the weighted lever being adapted to swing forwardly upon the downward inclination of the nose of the fuselage to disengage the bolt for the purpose specified.

In testimony whereof he affixes his signature.

WILLIAM R. MARSHALL.